Figure 1A:
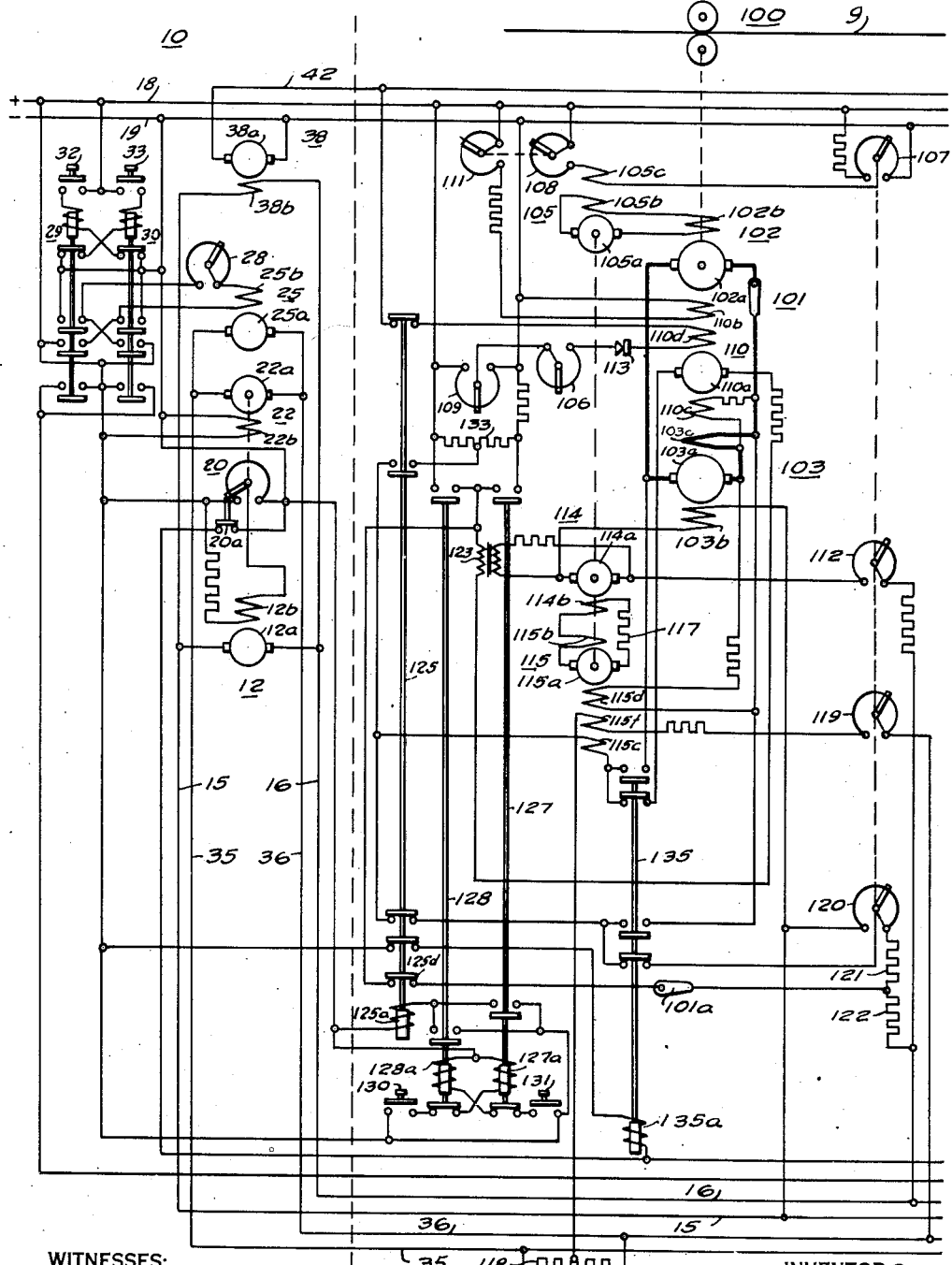

April 19, 1949.　　　　E. FRISCH ET AL　　　　2,467,735
MOTOR CONTROL SYSTEM

Filed June 30, 1947　　　　　　　　　　　　　　　3 Sheets-Sheet 1

WITNESSES:

INVENTORS
Erling Frisch, Clinton R. Hanna
and William O. Osbon.
BY
ATTORNEY

April 19, 1949.  E. FRISCH ET AL  2,467,735
MOTOR CONTROL SYSTEM
Filed June 30, 1947  3 Sheets-Sheet 3

WITNESSES:
E. A. M<sup>c</sup>Closkey
F. V. Giolma

INVENTORS
Erling Frisch, Clinton R. Hanna
and William O. Osbon.
BY
G. W. Crawford
ATTORNEY Patented Apr. 19, 1949

2,467,735

UNITED STATES PATENT OFFICE 2,467,735

MOTOR CONTROL SYSTEM

Erling Frisch, Clinton R. Hanna, and William O. Osbon, Pittsburgh, Pa., assignors to Westinghouse Electric Corporation, East Pittsburgh, Pa., a corporation of Pennsylvania Application June 30, 1947, Serial No. 758,197

18 Claims. (Cl. 318—77)

Our invention relates, generally, to motor control systems, and it has reference, in particular, to control systems for a plurality of motors connected to a common load, such as the roll stands and winding reel of a tandem strip rolling mill, or the like.

Generally stated, it is an object of our invention to provide a control system for the driving motors of a tandem rolling mill, which is simple and inexpensive to manufacture, and which is easy to operate and reliable and effective in operation.

More specifically, it is an object of our invention to provide, in a control system for a plurality of motors, for using separate main generators for supplying electrical energy to each of the motors and for maintaining the motors in predetermined operating relation by regulating the outputs of the several generators.

Another object of our invention is to provide, in a control system of the character described for a tandem rolling mill, for obtaining complete control of the driving motors by regulating the output of their individual main generators in accordance with a common reference voltage and the speeds of the individual motors.

Yet another object of our invention is to provide, in a control system for a plurality of driving motors in a tandem rolling mill, for normally operating the motors in predetermined speed relations and for progressively varying the speed relations of the motors of successive mill stands in accordance with the output voltage of a tapered tension generator when the mill is slowed down.

It is also an object of our invention to provide, in a control system for the driving motors of a tandem mill for increasing the amount of droop in the speed of the motors at the maximum speed, without materially affecting the amount of droop at threading speed.

A further object of our invention is to provide, in a control system for a plurality of mill motors, for using pilot generators individual to the motors to match the speeds of the several mill motors with a master reference voltage, and to vary the field excitation of the pilot generators to vary the speed relationships of the individual motors.

It is an important object of our invention to provide for controlling a plurality of driving motors of a tandem rolling mill by using buck and boost generators for varying the field excitation of main generators individual to each of the motors, which is obtained from a common source of reference voltage.

It is also an important object of our invention to provide for using a common variable reference voltage for collectively varying the speeds of a plurality of driving motors of a tandem rolling mill, and for varying the energizations of the motors during acceleration and deceleration in accordance with the rate of change of the reference voltage.

A yet further object of our invention is to provide for effectively preventing creeping of the driving motors of a tandem mill by utilizing the regulating generators, which normally control the outputs of the individual main generators supplying electrical energy to the motors, for positively reducing the outputs of the individual main generators to substantially zero values.

It is also a further object of our invention to provide for taking up or removing a loop of metal strip between the stands of the rolling mill by causing the driving motors of the successive roll stands to run at higher than normal operating speeds when the mill is started.

A further important object of our invention is to provide for maintaining an empty reel speed which is a predetermined amount in excess of the threading speed, regardless of the particular value of the threading speed.

Another important object of our invention is to provide for using a regulating generator as a speed regulator for controlling the speed of a reel motor during threading, and for automatically converting the regulating generator to a current regulator when the strip is wrapped on the reel, so as to regulate for strip tension.

Other objects will, in part, be obvious and will, in part, be explained hereinafter.

In accordance with one embodiment of our invention, the several driving motors of the roll stands and the delivery reel, hereinafter referred to as mill and reel motors, of a tandem strip rolling mill are each energized from individual main generators. The speeds of the motors are controlled by varying the outputs of their respective main generators through the use of individual control generators which vary the field excitation of their respective main generators from a value determined by having a common reference voltage supplied by a master generator. The control generators are regulated by individual regulating generators which are primarily responsive to the differentials between the output voltages of pilot generators associated with their respective motors and the common reference voltage provided by the master generator.

Forcing of the mill motors is effected by utilizing the voltage applied to the operating motor of a field rheostat of the master generator in order to modify the regulating actions of the regulating generators when accelerating or decelerating the mill. When starting the mill, the output voltages of the pilot generators of each mill motor, other than that driving the first stand, are modified, so as to increase the no load speed of their respective mill motors and also to increase the speed droop thereof to facilitate rapid takeup of any loop in the metal strip between the stands. Tapered tension is provided between the roll stands by modifying the output voltages of the pilot generators of the mill motors subsequent to the first roll stand, so as to progressively decrease the speeds of the successive roll stands by different amounts, when the reference voltage from the master generator is reduced to slow the mill down below a predetermined level.

Figure 1B:
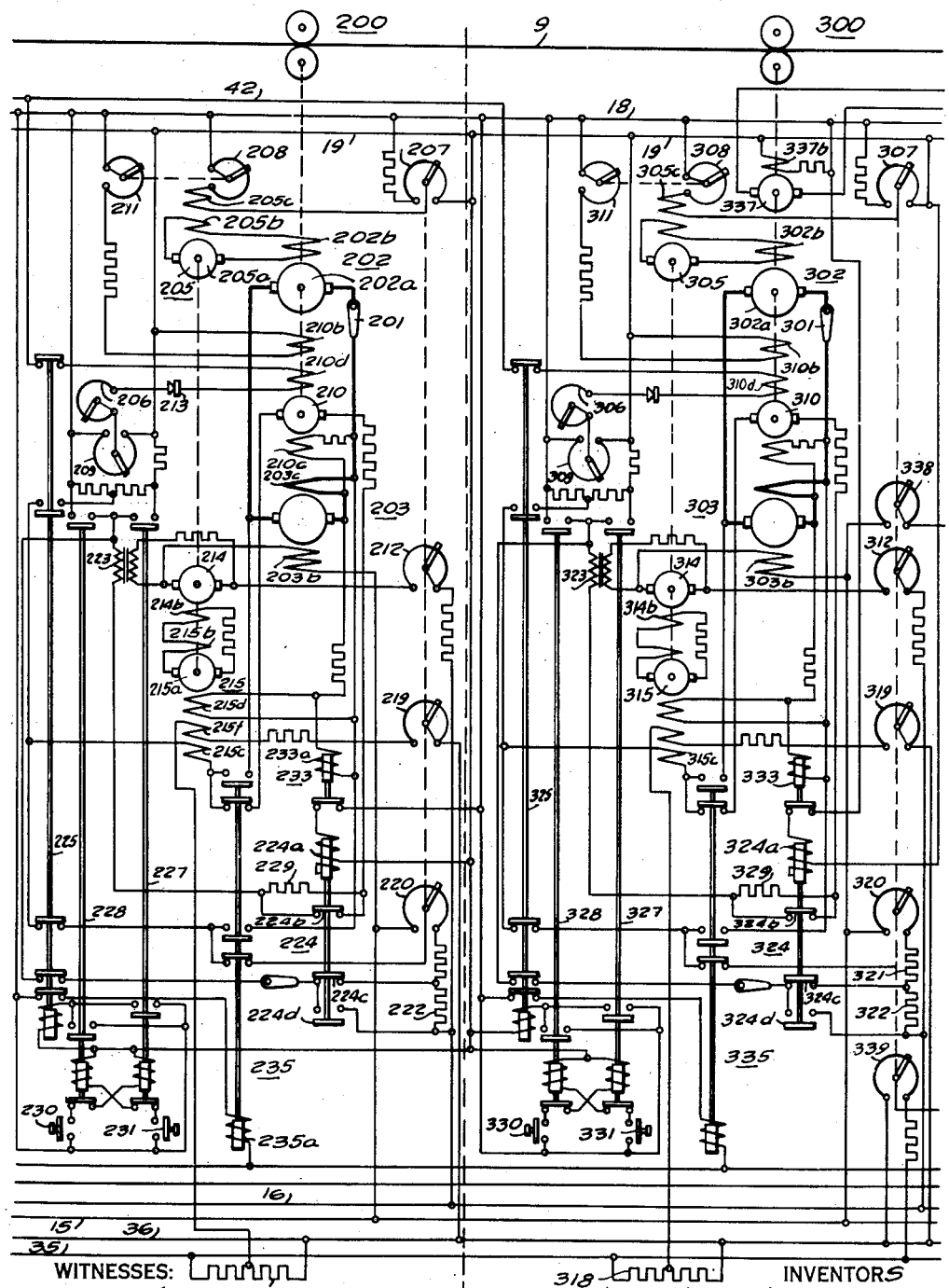
Figure 1C:
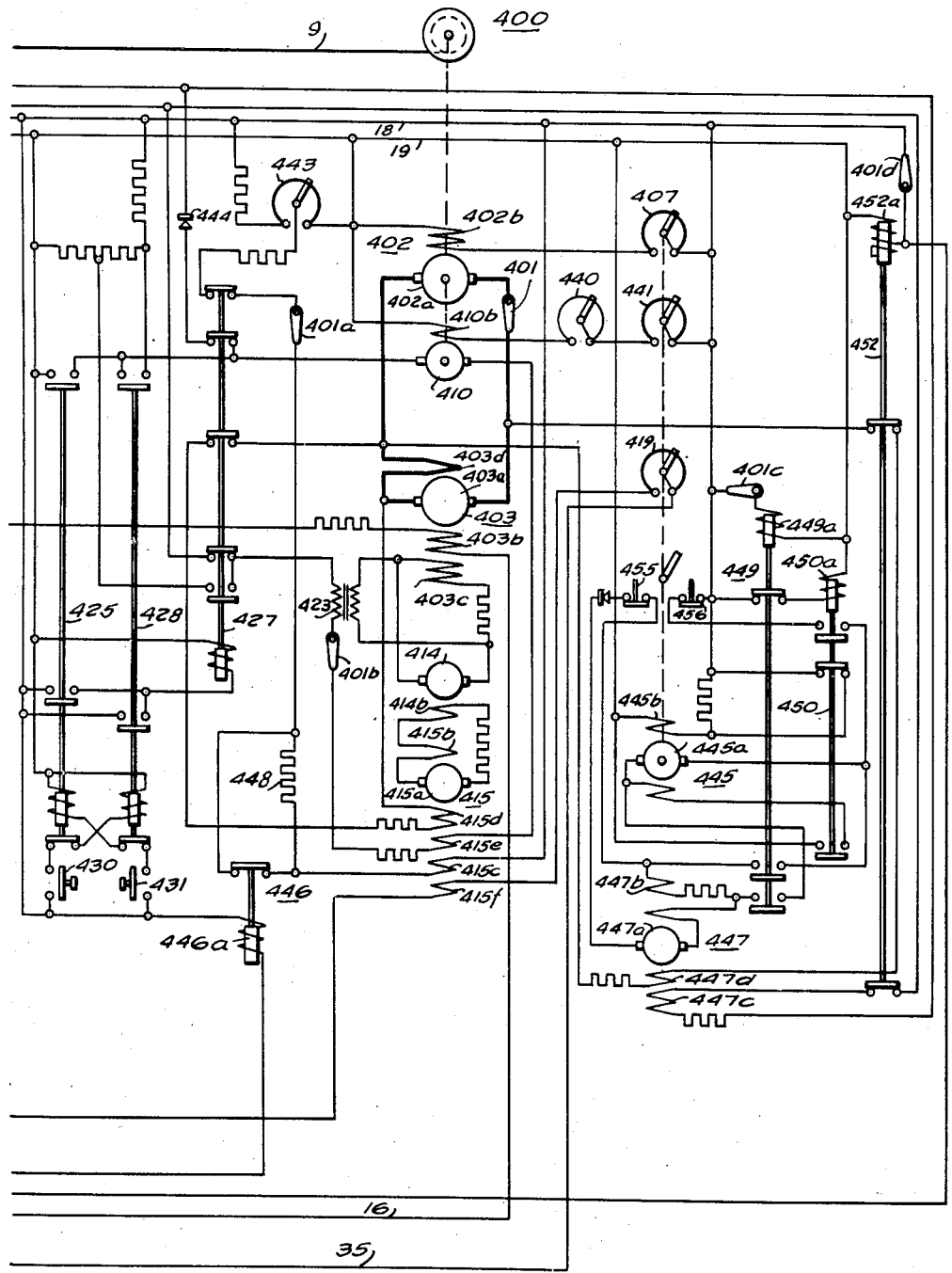

For a more complete understanding of the nature and scope of our invention, reference may be made to the following detailed description, which may be read in connection with the accompanying drawings, in which:

Figures 1a, 1b and 1c may be placed in side by side relation in that order, from left to right, to illustrate a diagrammatic view of a control system for the mill and reel motors of a tandem strip rolling mill.

Referring to Figures 1a, 1b and 1c, of the drawings, the reference numerals 100, 200 and 300 may denote successive roll stands of a tandem rolling mill in which a strip of material 9 is being rolled, and then wound on a delivery reel 400. The roll stands and the reel may be provided with driving motors 102, 202, 302 and 402 respectively, which are arranged to be supplied with electrical energy from separate main generators 103, 203, 303 and 403, respectively.

Referring to Fig. 1a, it will be seen that in order to provide for collectively controlling the speeds of the several mill and reel motors, common control means may be provided, designated generally by the numeral 10. The control means may comprise, for example, a master generator 12 having an armature 12a and field winding 12b. The armature 12a may be connected to the conductors 15 and 16 of a reference voltage bus for supplying a common variable reference voltage for controlling the operation of the several mill and reel motors.

In order to vary the output voltage of the master generator 12, the field winding 12b may be connected to a suitable source of substantially constant control potential represented by the control conductors 18 and 19, through a master rheostat 20. The rheostat may be provided with an operating motor 22 having an armature 22a and a field winding 22b. The field winding 22b may be energized from the control conductors 18 and 19.

The armature 22a may be supplied with electrical energy from a rheostat generator 25 having an armature 25a connected in circuit relation therewith and provided with a field winding 25b. The field winding 25b may be connected to the control conductors 18 and 19 through an accelerating rate adjusting rheostat 28, which determines the voltage applied to the armature of the rheostat motor, and through one or the other of "raise" and "lower" control switches 29 and 30, which may be selectively controlled by means of "raise" and "lower" pushbutton switches 32 and 33. Since the voltage applied to the rheostat motor 22 from the rheostat generator 25 controls the speed of the motor, and rate of change of the reference voltage produced by the master generator 12, and hence controls the rate of acceleration or deceleration of the mill, the voltage from the rheostat generator 25 may be used for "forcing" the mill motors during acceleration or deceleration of the mill, to compensate for differences in field time constants, rates of acceleration and inertia of the several motors, etc., and may, accordingly, be applied to the conductors 35 and 36 of a forcing bus.

In order to provide for selectively controlling the operations of the several mill motors under predetermined speed conditions, a tapered tension generator 38 may be provided, having an armature 38a and a field winding 38b. The field winding 38b may be energized from the reference voltage bus conductors 15 and 16 so as to produce a voltage proportional to the reference voltage. The armature 38a may be connected to conductors 19 and 42 to provide a tapered tension bus for effecting suitable control of the several mill motors in a manner which will be explained hereinafter in detail. The master generator 12, the rheostat motor generator 25, and the tapered tension generator 38 may be driven in any suitable manner well known in the art, and accordingly, no specific driving means is shown, in order to simplify the drawings as much as is possible.

The mill motor 102 of the first stand may comprise an armature 102a and a field winding 102b. The armature may be connected in driving relation with the rolls of the roll stand 100 and supplied with electrical energy by being connected through a main switch or circuit breaker 101 to the armature 103a of the main generator 103, which has a main field winding 103b and a compensating field winding 103c.

The field winding 102b of the mill motor may be energized from a field exciter 105 having an armature 105a, a differential field winding 105b, and a main field winding 105c. The differential field winding may be connected in circuit relation with the field winding 102b of the mill motor. Winding 105b thus tends to make the motor field current independent of exciter saturation effects and resistance variations due to temperature changes. The main field winding 105c of the exciter may be energized from the control bus conductors 18 and 19 through a main motor speed adjusting rheostat 107 and a vernier rheostat 108.

A pilot generator 110 having field windings 110b, 110c and 110d, and an armature 110a connected in driving relation with the armature 102a of the mill motor 102 may be provided for producing a control voltage which is substantially proportional to the speed of the mill motor 102. The field winding 110b may be energized from the control bus conductors 18 and 19 through a vernier field rheostat 111 which may be operatively connected to the vernier rheostat 108 of the field exciter 105.

The field winding 110c may be energized in accordance with the armature current being, for example, connected across the compensating field winding 103c of the main generator 103, so as to be cumulative with respect to the field winding 110b. This provides the motor 102 with a speed droop proportional to its load.

The field winding 110d may be energized in accordance with the difference between a portion of the excitation voltage from the bus conductors 18 and 19 and the voltage of the tapered tension generator 38. The winding 110d may, for example, be connected between the conductors 42 and 18 through a rheostat 106 and a potentiometer 109 in circuit with a rectifier device 113, which blocks the flow of current so long as the speed of the mill motor is above a predetermined value. The field winding 110d may be cumulative or differential, depending upon whether successive stands are slowed down, or whether, the preceding stands are speeded up to secure the tapered tension.

The speed of the mill motor 102 may be controlled, generally, by effecting energization of the field winding 103b of the main generator 103 by connecting the field winding to the reference voltage bus conductors 15 and 16 through a field rheostat 112. The rheostat 112 may be operatively connected to the motor field rheostat 107 so as to provide for varying the speed of the mill motor 102 by sequentially raising the generator voltage, and then weakening the motor field when increasing the motor speed, and first strengthening the motor field, and then decreasing the generator voltage when decreasing the motor speed.

In order to regulate the speed of the mill motor 102, a control generator 114 may be provided having an armature 114a, and a field winding 114b. The armature may be connected in series circuit relation with the field winding 103b and the field rheostat 112 for bucking or boosting the voltage of the reference voltage bus.

Regulation of the mill motor speed may be effected by energizing the field winding 114b of the control generator 114 from a regulating generator 115 having an armature 115a, a self-energizing field winding 115b, a pilot field winding 115c, a differential field winding 115d, and a forcing field winding 115f. The self-energizing field winding 115b may be connected in circuit relation with the field winding 114b and a tuning resistor 117 so as to provide a high steady state amplification factor. The differential field winding 115d may be connected across the compensating field winding 103a of the main generator 103 so as to be energized in accordance with the armature current of the mill motor 102, whereby a controlled drooping speed characteristic may be imparted to this motor in accordance with the load.

The forcing field winding 115f may be connected to the forcing bus conductors 35 and 36 through a potentiometer 118 and rheostat 119, which may be operatively connected to the rheostats 107 and 112, and arranged to vary the amount of forcing when the rheostat 107 operates to vary the field excitation of the motor 102. In this manner provision may be made for increasing or decreasing the torque of the mill motor during acceleration and deceleration to so compensate for differences between the field time constants, rates of acceleration, and the associated inertias among the several motors as to assist in maintaining the tension of the strip 9 more nearly constant.

The pilot field winding 115c may be energized in accordance with a differential in voltage between the voltage of the pilot generator 110 and the voltage of the reference bus conductors 15 and 16 so as to provide for matching the speed of the motor 102 with the value of the reference voltage. The pilot field winding may be connected across a portion of a potentiometer 120 in series circuit relation with the armature 110a of the pilot generator 110 and a control resistor 121, through an auxiliary contact member 101a of the main switch 101. The potentiometer and resistor 121 may be connected to the reference bus conductors 15 and 16 through an additional control resistor 122. An anti-hunt transformer 123 may be connected in circuit relation with the field winding 115c for introducing a corrective voltage responsive to the rate of change of voltage of the control generator 114.

In order to provide for effecting an inching or jogging operation of the mill motor 102, a main jogging switch 125 may be provided having an operating winding 125a, together with "forward" and "reverse" jogging switches 127 and 128 having operating windings 127a and 128a, respectively. These jogging switches may be selectively operated under the control of "forward" and "reverse" pushbutton switches 130 and 131 so as to disconnect the pilot field winding 115c from the reference voltage bus conductors 15 and 16, and for connecting it to the control bus conductors 18 and 19 through a potentiometer 133 with one polarity or the other for effecting forward or reverse operation of the mill motor at a reduced speed. The main jogging switch 125 may also be used to disconnect the tapered tension field winding 110d of the pilot generator 110 during a jogging operation.

Since the mill motor 102 is connected directly to the armature of the main generator 103, creeping or relatively slow operation of the mill motor may result because of the residual voltage of the master generator when the master rheostat 20 is operated to the zero voltage or "off" position. In order to prevent creeping of the mill motor, a suicide switch 135 may be provided having an operating winding 135a. The operating winding 135a may be connected to the control bus conductors 18 and 19 through a limit switch 20a, which is operated to the closed position when the master rheostat 20 is returned to the "off" position.

The suicide switch 135 may be disposed to disconnect the pilot field winding 115c from the reference voltage bus conductors 15 and 16 and connect it across the armature 103a of the main generator 103. The pilot field winding 115c may be disposed for connection to the armature 103a in differential relation, so as to cause the regulating generator 115 to control the output of the control generator 114 in such a manner as to force the output voltage of the main generator 103 down to a substantially zero value. The energizing circuit for the suicide relay 135 may include contact members 125d of the jogging switch 125, so that the suicide relay may be rendered ineffective when jogging or inching the mill motor 102.

The main generator 103 may be driven in any suitable manner, as may also the regulating generator 115, the control generator 114, and the field exciter 105. Accordingly the motive means, which may comprise alternating current motors, are not shown.

Referring now to Figure 1b of the drawings, it will be seen that the output voltage of the main generator 203, which supplies electrical energy to the armature 202a of the mill motor 202 through a main switch 201, is controlled in a similar manner by a control generator 214 which is, in turn, controlled by having its field winding 214b energized from a regulating generator 215 having an armature 215a. The regulating generator 215 is provided with self-energizing, pilot, differential and forcing field windings 215b, 215c, 215d and 215f, respectively, connected in a manner similar to that of the corresponding field windings of the regulating generator 115 of Fig. 1a. The control generator 214 is likewise connected in circuit relation with the field winding 203b of the main generator 203 and the reference voltage bus conductors 15 and 16, through a field rheostat 212.

The field winding 202b of the mill motor 202 may be similarly energized from a field exciter 205 having an armature 205a, a differential field winding 205b, and a main field winding 205c which may be energized from the control bus conductors 18 and 19 through a main speed adjusting field rheostat 207, and a vernier motor field rheostat 208. The mill motor 202 may also be provided with a pilot generator 210 having a main field winding 210b, a cumulative current field winding 210c, and a tapered tension field winding 210d.

The main field winding 210b may be energized from the control bus conductors 18 and 19 through a vernier field rheostat 211 which may be operatively connected to the vernier field rheostat 208 of its associated mill motor. The current field winding 210c may be connected across the compensating field winding 203c of the main generator 203 to provide increased droop in the speed of the mill motor 202 at maximum speed, without materially affecting the speed droop at threading speed, which may be on the order of 10% of the normal running speed.

In order to provide for tapered tension between the roll stand 200 and either the roll stand 100 or the roll stand 300 when the mill is operating at relatively slow speeds, the tapered tension field winding 210d of the pilot generator may be disposed to vary the field excitation thereof so as to cause the mill motor 202 to run at either slightly slower than the normal speed relative to that of the mill motor 102, or at slightly higher than the normal speed relative to that of the mill motor 302. The field winding 210d may be so connected to the control bus conductors 18 and 19 through a potentiometer 209 with the voltage of the tapered tension bus conductor 42 in opposed relation therewith, that it is cumulative or differential depending on whether the roll stand 200 is to be slowed down relative to the roll stand 100, or speeded up relative to the roll stand 300. A rectifier device 213 may be connected in circuit relation with the field winding 210d so as to permit the flow of current therethrough, only whenever the reference voltage is reduced below a predetermined value as determined by the setting of the potentiometer 209. A rheostat 206 determines the degree of energization of the tapered tension field winding 210d and the degree of recalibration of the pilot generator 210, whereby the mill motor 202 is caused to operate at a speed which may be, for example, a predetermined amount slower than the normal relative value.

In order to provide for rapidly removing a loop in the strip material 9 between the roll stands 100 and 200, suitable control means may be provided for so increasing both the no-load speed and speed droop of the mill motor 202 when the mill is first started, that the full load speed is substantially unaffected. For example, a loop takeup relay 224 may be utilized, having an operating winding 224a. The operating winding 224a may be connected to the control bus conductors 18 and 19 so as to effect operation of the loop takeup relay as soon as the control bus conductors are energized for starting the mill, to insert a control resistor 229 in circuit relation with the pilot field winding 215c so as to increase the speed droop of the mill motor 202.

At the same time, this relay 224 may be utilized to connect the pilot field winding 215c of the regulating generator 215 across the additional control resistor 222 connected in circuit relation with the potentiometer 220, so as to apply a greater proportion of the voltage from the reference bus conductors 15 and 16 thereto. This effectively increases the no-load speed of the mill motor and permits the roll stand 200 to operate at a speed higher than the normal value so as to rapidly remove any loop in the material between the roll stand 100 and the roll stand 200.

Control means, such as the load responsive relay 233, may be provided for restoring the mill motor 202 to its normal operating speed characteristics when the strip is threaded. The operating winding 233a of this relay 233 may be connected across the compensating field winding 203c of the main generator 203, so as to interrupt the energizing circuit for the loop takeup relay 224, whenever load is applied to the mill motor 202. The loop takeup relay 224 may be of the delayed dropout type so as to remain in the energized position for a predetermined interval of time after operation of the load responsive relay 233, during which time the mill motor 202 operates at an increased speed so as to remove the loop.

The control equipment for the mill motor 202 may also comprise a suicide switch 235 having an operating winding 235a energized through the limit switch 20a of the master rheostat 20 in a similar manner to that of the suicide switch 135. The suicide switch 235 operates to transfer the pilot field winding 215c to buck down the voltage of the main generator 203 as described in connection with the main generator 103 of Fig. 1a.

In a like manner, main and "forward" and "reverse" jogging switches 225, 227 and 228, respectively, may be provided, together with corresponding "forward" and "reverse" pushbutton switches 230 and 231, for reconnecting the pilot field winding 215c to the control bus conductors 18 and 19 for inching or jogging the roll stand 200. An antihunt transformer 223 may be used in circuit relation with the pilot field winding 215c.

The control equipment for the mill motor 302 is also substantially identical with that for the mill motors 102 and 202. The main field winding 302b may be energized from an exciter 305 having a main field winding 305c energized from the conductors 18 and 19 through a main field rheostat 307 and a vernier rheostat 308. The armature 302a of the motor 302 may be supplied with electrical energy from a main generator 303 through a main switch 301, and the generator may have a main field winding 303b energized from the reference voltage bus conductors 15 and 16 through a field rheostat 312. A control generator 314 having field winding 314b is utilized to buck and boost the reference voltage. Operation of the regulating generator 315 to control the output of the control generator 314 is effected in a manner substantially identical to that described in connection with the regulating generators 115 and 215, the pilot field winding 315c being energized in accordance with the differential between the voltage of the pilot generator 310 and the voltage derived from the reference bus conductors through a potentiometer 320 and resistors 321 and 322. The main field winding 310b of the pilot generator 310 may be energized from the conductors 18 and 19 through a vernier rheostat 311 coupled to the rheostat 308. A tapered tension field winding 310d connected to the bus conductors 19 and 42 through a potentiometer 309 and a rheostat 306.

In addition to the pilot generator 310, which is identical with the pilot generator 210 of the preceding roll stand, the mill motor 302, being immediately ahead of the reel motor 402, is provided with an additional pilot generator 337 having a field winding 337b, for providing a voltage responsive to the speed of the mill motor 302 for controlling the operation of the reel motor. In addition to the motor field rheostat 307, the generator field rheostat 312, the forcing field rheostat 319, and the pilot field potentiometer 320 which correspond to similar rheostats of the previous roll stands, additional rheostats 338 and 339 may be operatively connected with the rheostats of stand 300 for controlling the operation of the reel motor in a manner which will hereinafter be described.

A suicide switch 335 may be provided for reducing the voltage of the main generator 303 in the same manner as described in detail in connection with Fig. 1a. Likewise, a load relay 333 and a loop takeup relay 324 may be utilized corresponding to the similar relays 233 and 224 of stand 200. Main and "forward" and "reverse" jogging switch 325 and 327 and 328, respectively, may also be provided, together with their associated pushbutton switches 330 and 331, for inching or jogging the roll stand 300, as described in detail in connection with Fig. 1a. An anti-hunt transformer 323 may be used in circuit relation with the pilot field winding 315c of the regulating generator to stabilize the operation thereof.

Referring to Figure 1c of the drawings, it will be seen that the reel motor 402 may be provided with a pilot generator 410 having a field winding 410b energized from the control bus conductors 18 and 19 through a threading speed adjusting rheostat 440 and a coil build-up rheostat 441. The field winding 402b of the reel motor may be energized directly from the control bus conductors 18 and 19 through a main field rheostat 407. The armature 402a of the reel motor may be supplied with electrical energy from the main generator 403 having main and regulating field windings 403b and 403c, respectively, through a main switch 401.

The main field winding 403b may be connected to the reference bus conductors 15 and 16 through the field rheostat 338 of Fig. 1b, which may be operatively connected to the main field rheostat of the mill motor 302. The regulating field winding 403c may be energized from a control generator 414 having a field winding 414b which is, in turn, energized from a regulating generator 415 having self-energizing, pattern, differential current, threading speed control, and forcing field windings 415b, 415c, 415d, 415e and 415f, respectively.

The self-energizing field winding 415b is connected in circuit relation with the armature 415a in the usual manner. The differential field winding 415d may be energized in accordance with the armature current of the reel motor 402, being, for example, connected across the compensating field winding 403d of the main generator 403 thereof. The pattern field winding 415c may be energized from the control bus conductors 18 and 19 through an auxiliary contact 401a of the main switch 401 and a tension adjusting potentiometer 443.

The threading speed field winding 415e may be normally connected for energization through an auxiliary contact 401b of the main switch 401, in accordance with the differential voltage between the voltages of the pilot generator 337 of the roll motor 302 and the pilot generator 410 of the roll motor 402. A rectifier 444 may be so connected in series circuit relation with the field winding 415e and the armatures of the pilot generators 410 and 337 that it blocks the flow of current when the voltage of the pilot generator 337 is the higher, which will be the situation when the strip is wrapped on the reel. When the speed of the reel increases during threading, through the regulating action of the regulating generator 415, the voltage of the pilot generator 410 predominates, and the M. M. F. of the winding 415e opposes that of the pattern field winding 415c, and limits the speed of the reel motor to about 110% of the speed of the last roll stand.

The forcing field winding 415f may be energized both in accordance with the rate of change of the reference voltage, the speed of the mill motor 302, and the diameter of the coil of material on the reel 400. This field winding may, accordingly, be energized from the forcing bus conductors 35 and 36 through the potentiometer 339 of Fig. 1b, which is actuated in accordance with the speed of the mill motor 302, and through a forcing rheostat 419 which may be actuated in accordance with the diameter of the coil of material on the reel 400. An anti-hunt transformer 423 may be connected in circuit with the field winding 415e.

In order to provide for actuating the field rheostats 407, 441 and 419, in accordance with the diameter of a coil on the reel 400, a rheostat motor 445 having an armature 445a and a field winding 445b, energized from the control bus conductors 18 and 19, may be connected in driving relation therewith. The armature 445a may be normally energized from a rheostat motor generator 447 having an armature 447a, a self-energizing field winding 447b, a pattern field winding 447c and a differential field winding 447d.

The self-energizing field winding 447b may be connected across the armature 447a and disposed to supply a part of the air gap magnetomotive force losses. The pattern field winding 447c may be connected across the armature of the pilot generator 337 of the roll motor 402 for matching the speed thereof. The differential field winding 447d may be connected across the armature 403a of the main generator 403. Accordingly, when the reel motor slows down due to the increasing diameter of the coil on the reel, the magnetomotive force of the field winding 447c predominates, and the rheostat generator 447 energizes the rheostat motor 445 to operate the rheostats 407, 441 and 419 to increase the field excitation of the reel motor, and compensate the pilot generator 410 and the regulating generator 415 for the decreased speed of operation of the reel motor.

In order to provide for maintaining the tension of the strip 9 at a decreased value when the mill is stopped, a tension control relay 446 may be provided having an operating winding 446a which is energized when the master switch 20 is returned to the "off" position. The operation of the relay 446 inserts a control resistor 448 in circuit with the pattern field winding 415c of the regulating generator 415, so as to provide for lowering the value of armature current at which a balance is obtained, and thus maintaining a reduced value of tension in the strip 9.

In order to provide for returning the reel motor field rheostat 407 to the starting position as soon as a winding operation is completed, a reset relay 449 may be provided, having an operating winding 449a which may be normally connected to the control bus conductors 18 and 19 through an auxiliary contact member 401c of the main switch 401 in the armature circuit of the reel motor 402. An auxiliary reset relay 450 having an operating winding 450a may be utilized in connection with the reset relay 449 to transfer the armature 445a of the rheostat motor 445 from the rheostat generator 447 to the control bus conductors 18 and 19 to effect high speed reverse operation of the rheostat motor. Limit switches 455 and 456 may be used in connection with the rheostat motor 445 for interrupting the operating circuit of the motor in the maximum and minimum positions of the rheostats.

The reel motor may also be provided with main, and "forward" and "reverse" jogging switches 425, and 427 and 428 which as in the case with the mill motors, are selectively operated by "forward" and "reverse" pushbutton switches 430 and 431, respectively.

In order to prevent operation of the rheostat motor 445 when the reel motor 402 is first energized, and before it has time to accelerate to its normal operating speed, a time delay relay 452 may be utilized. The operating winding 452a of this relay may be connected across the control bus conductors 18 and 19 through a normally closed auxiliary contact member 401d of the main switch 401. Operation of the time delay relay interrupts the energizing circuit of the pattern field winding 447c of the rheostat generator for a predetermined interval of time after the main switch 401 is closed to start the reel motor 402, which may be sufficient to permit the reel motor to accelerate to its normal operating speed.

When starting the mill from standstill, the control bus conductors 18 and 19 are energized and the accelerating rate rheostat 28 is set so that the rheostat generator 25 produces the voltage required for the desired rate of acceleration. The "raise" pushbutton switch 32 may be actuated to cause the rheostat motor 22 to actuate the master rheostat 20, and increase the voltage of the master generator 12 to the value necessary for obtaining the desired threading speed for the mill. The speeds of all the mill motors and the reel motor are increased simultaneously with increase of the reference voltage, which increases the output voltage of the individual main generators 103, 203, etc. directly.

Since the rate of acceleration of the mill is determined by the speed of the master rheostat motor 22, the voltage applied to the forcing bus conductors 35 and 36 is a measure of the acceleration desired. The regulating generators 115, 215, 315 and 415 are each compensated in accordance with this voltage in the particular amounts necessary in order to overcome the inertia of the mill, field constants, etc., and attain the desired speed more rapidly. When it is attained the output voltages of the main generators of the mill motors are in each instance regulated generally by the differential, if any, between the common reference voltage and the voltages of the pilot generators of the respective motors, this differential being applied to the pilot field windings of the regulating generators, so that the mill motors will normally operate in a predetermined speed relation. The voltage of the main generator of the reel motor, however, matches the speed of the preceding roll stand, since the main field winding is energized from the reference voltage bus through a rheostat 338 operated in accordance with the field rheostat 307 of the mill motor 302. The reel motor runs at a speed which is about 10% above the threading speed, because of the regulating action of the field winding 415e. This field winding neutralizes in part the normal regulating action between the pattern and differential field windings 415c and 415d, and limits the speed of the reel motor.

When the mill is being threaded, it is customary to provide a loop in the strip between the stands. Takeup of such loop is desirable as soon as possible. This result is obtained as the loop takeup relays 224 and 324 of roll stands 200 and 300 are automatically energized when the mill is started, since their operating windings 224a and 324a are connected to the control bus conductors 18 and 19 through normally closed contact members of the load responsive relays 233 and 333, respectively. Operation of these switches automatically increases the no-load speeds of the mill motors 202 and 302 by opening contact members 224c and 324c, and closing contact members 224d and 324d, thereby connecting the pilot field windings 215c and 315c of the regulating generators 215 and 315 across the additional control resistors 222 and 322, respectively, whereby a greater proportion of the reference voltage is applied thereto. At the same time, the speed droop of the mill motors 202 and 302 is increased, by inserting the control resistors 229 and 329 through the opening of contact members 224b and 324b in series circuit relation with the pilot field windings.

As soon as the strip 9 of metal enters the roll stands 200 and 300, the load responsive relays 233 and 333 associated therewith, operate to de-energize the loop takeup relays. Because of the time delay characteristics of these relays, they remain in the energized position for predetermined intervals of time. The loops between the stands 100, 200 and 300 will be taken up during these periods of time, as a result of the relatively higher than normal speeds of the driving motors 200 and 300 of their respective roll stands.

As soon as the strip is threaded, the speed of the mill may be raised to normal operating speed by operating the "raise" pushbutton switch 32. During normal operation the speeds of the mill stands are regulated by their respective regulating generators so that the voltages of their respective pilot generators match the voltages derived from the reference voltage bus. The tension of the strip is maintained as the strip is wound on the reel through the current regulating action of the regulating generator 415 which, in conjunction with motor operated rheostat 407, operates to maintain the tension of the strip constant, independently of the diameter of the coil on the reel. Since the voltage of the pilot generator 337 is normally slightly higher than that of the pilot generator 410, and the rectifier 444 blocks the flow of current under this condition, the regulating generator 415 automatically changes from a speed regulator to a current regulator as soon as the strip is wrapped.

Compensation for coil build-up is effected by means of the rheostat motor 445, which actuates the reel motor field rheostat 407 to increase the energization of the field winding 402b as the diameter of the coil on the reel increases. This operation results from decreased voltage of the reel generator, relative to the speed of roll stand 300, which upsets the balance between the mmf. of field windings 447c and 447d and energizes the rheostat generator 447. The rheostat generator energizes the rheostat motor 445, and the rheostats 407, 441 and 419 are actuated. The energization of the motor field winding 402b is increased, as is that of the pilot field winding 410b and the forcing field winding 415f.

When the speed of the mill is being decreased at the end of an operation, varying degrees of forcing are required to maintain the proper relative speed of all the motors because of the considerable differences which exist in the field time constants, the rates of deceleration, and the inertias of the motors, and different parts of the mill drive. The rate of deceleration for the whole mill is a function of the speed, and consequently of the armature voltage of the master rheostat motor 22. This voltage supplied to the common forcing bus conductors 35 and 36 serves as a pattern for the forcing applied to each of the motors. The forcing field windings 115f, 215f, 315f and 415f of the regulating generators for the several mill motors and reel motor are energized from the forcing bus which bucks the normal energization of pilot field windings from the reference voltage bus during deceleration. The amount of forcing is adjusted by the forcing potentiometer resistors 118, 218, 318 and 339 connected to the forcing bus conductors while the forcing rheostats 119, 219, 319 and 419 connected to the respective motor field rheostats recalibrate the forcing fields for different speeds of the motors which may be effected by motor field adjustment.

When the mill is slowed down, relatively high strip tension may result if no compensation is provided therefor. However, since the pilot generators 210 and 310 are provided with tapered tension field windings 210d and 310d, respectively, the output voltages of these pilot generators will increase for a given speed whenever the reference bus voltage drops below the value required to balance the control bus potentials derived from the potentiometer 209 and 309. The regulating generators 215 and 315 operate to regulate the generators 203 and 303 to give slightly lower than normal speeds of the motors for the given reference voltage. Tension of the strip 9 between the stands 100, 200 and 300 may, therefore, be prevented from increasing excessively.

When the mill is stopped by moving the master rheostat 20 to the stop or "off" position, the reference bus conductors 15 and 16 remain energized with the residual voltage of the master generator 12. This causes some excitation of the several main generators, and results in creeping of the mill motors. In this instance, however, when the mill is stopped, the suicide relays 135, 235 and 335 are immediately energized through the master switch 20a, and operate to disconnect the pilot field windings 115c, 215c and 315c of the regulating generators 115, 215 and 315, respectively, from the reference voltage bus and their respective pilot generators, and connect them across the armatures of their respective main generators in differential relationship. Accordingly, the voltage output of the main generators are forced down to substantially zero values to prevent any creeping of the mill motors.

As soon as the main switch 401 is opened to deenergize the reel motor 402 at the end of a winding operation, the reset relay 449 is deenergized. This disconnects the rheostat motor armature 445a from the reel motor generator 447. The auxiliary reset relay 450 is thereupon energized, and connects the rheostat motor to the control bus conductors 18 and 19 to return the rheostat at high speed to the starting position. Limit switch 455 stops the motor when it reaches its zero position.

When the mill is stopped or stalled, the coil build-up rheostat motor 445 of the reel motor also stops. The tension controlling regulating generator 415 continues to regulate the current through the reel motor armature. Since full current at standstill may not be desirable, the tension control relay 446 operates when the master rheostat is returned to the "off" position to insert resistor 448 in the circuit of the pattern field winding 415c, so that the regulating generator regulates for a lower value of current when the mill is stalled. A lower value of tension is therefore maintained in the strip 9.

Should it be desired to inch or jog any one of the mill motors individually, such as for the purpose of removing a portion of the strip therefrom should it break, such operation may be effected by means of the jogging relays. For example, should it be desired to operate the mill motor 102, the "forward" jogging pushbutton switch 130 may be operated to energize the "forward" jogging switch 127 and the main jogging switch 125. The pilot field winding 115c will be, accordingly, connected to the control bus conductors 18 and 19 through the potentiometer 133 in such a direction as to apply a reduced voltage in series circuit relation with the pilot field winding and the armature of the pilot generator 110 for causing forward operation of the motor. When the pushbutton switch 130 is released, the jogging switches 125 and 127 will be deenergized, so as to stop the mill motor 102.

From the above description and the accompanying drawings, it will be apparent that we have provided a complete and comprehensive control system for a tandem strip rolling mill wherein the driving motors of the several roll stands and the reel are energized from individual generators which are responsive to a common reference voltage. Predetermined speed relations may be readily maintained to provide stable operation of the mill. Loop takeup is provided by increasing the no-load speeds of the driving motors of the successive roll stands, and at the same time increasing the amount of speed droop when the mill is first started. Jogging of the mill stands is provided through operation of the regulating generators, so as to obtain regulated control of the motors. Inertia compensation is provided during acceleraion and deceleration by utilizing the voltage applied to the master rheostat motor for forcing the motors by increasing or decreasing the operating voltages of the regulating generators during acceleration and deceleration, respectively. By utilizing the features hereinabove set forth and explained, we have provided a complete and flexible operating system which is capable of stable operation at relatively high operating speeds.

Since certain changes may be made in the above described construction and different embodiments of the invention may be made without departing from the spirit and scope thereof, it is intended that all the matter contained in the above description and shown in the accompanying drawings shall be considered as illustrative and not in a limiting sense.

We claim as our invention:

1. In a control system for a plurality of motors connected in driving relation with a common load, a main generator individual to each motor, a pilot generator individual to each motor operable to produce a voltage responsive to the speed of its associated motor, circuit means individual to each main generator operable to vary the output thereof including a control generator connected in circuit relation with a variable reference voltage, and control means individual to each control generator including regulating means differentially responsive to the voltage of the pilot generator of its associated motor and the reference voltage for regulating the output of the control generator.

2. A control system for a plurality of motors connected in driving relation with a continuous length of material comprising, a main generator individual to each motor for supplying electrical energy thereto, a control generator connected in circuit relation with a variable voltage to control the output of each main generator, a pilot generator individual to each motor operable to produce a voltage responsive to the speed of the motor, and a regulating generator individual to each control generator responsive to the differential between the speed responsive voltage of the pilot generator of the motor associated with said control generator and the common reference voltage, said regulating generator being operable to maintain its associated motor in predetermined speed relation with the reference voltage.

3. A control system for a plurality of motors connected in driving relation with a length of material comprising, a main generator individual to each motor for supplying electrical energy thereto, a pilot generator individual to each motor operable to produce a voltage responsive to the speed thereof, control means producing a variable reference voltage, a regulating generator individual to each main generator operable to control the output thereof, and adjustable circuit means associated with each regulating generator connected to produce a differential voltage between portions of the common reference voltage and the voltage produced by the pilot generator of the motor associated with said regulating generator for controlling operation of said regulating generator.

4. A control system for an electric motor comprising, a main generator connected for supplying electrical energy to the motor, a master generator operable to provide a variable control voltage for varying the energization of said main generator, control means producing a voltage variable in accordance with the rate of change of the variable control voltage, and circuit means connected to apply the variable voltage for modifying the variation in energization of the main generator due to operation of the master generator.

5. In a control system for an electric motor, circuit means for applying a variable voltage to the motor, a regulating generator connected to regulate the speed of the motor, excitation means for said generator responsive to the difference between a desired speed and the actual speed of the motor, and additional excitation means for said generator responsive to the rate of change of the variable voltage for modifying the rate of acceleration or deceleration of the motor.

6. In a control system for an electric motor, circuit means for producing a variable reference voltage, a regulating generator connected to regulate the speed of the motor, a pilot generator operable to produce a control voltage proportional to the speed of the motor, excitation means for the regulating generator responsive to a difference between the voltage of the pilot generator and the reference voltage, and excitation means for the pilot generator responsive to the load on the motor connected to produce a speed droop proportional to the load on the motor.

7. In a control system for a plurality of motors connected in driving relation with a strip of material, a main generator individual to each motor for supplying electrical energy thereto, a master generator operable to produce a common variable reference voltage for controlling the main generators collectively, a control generator connected to vary the output of each main generator from that determined by the reference voltage, a pilot generator individual to each motor operable to produce a voltage proportional to the speed thereof, a regulating generator individual to each control generator for regulating the output thereof, circuit means producing a differential between the voltage proportional to the speed of a motor and the reference voltage and connected to control the output voltage of the regulating generator associated with said motor, and additional circuit means responsive to the rate of change of said reference voltage connected to cumulatively modify the output of the regulating generator.

8. A control system for a plurality of motors having a driving connection with a continuous length of strip material comprising, a main generator individual to each motor for supplying electrical energy thereto, a pilot generator individual to each motor for normally producing a voltage responsive in a predetermined relation to the speed thereof, circuit means operable to produce a common variable reference voltage, control means including a regulating generator individual to each main generator, each of said regulating generators being responsive to a differential between the voltage responsive to the speed of its associated motor and a portion of the common reference voltage for maintaining a predetermined relation between the speed of the motor and said reference voltage, and additional circuit means responsive to the reference voltage connected to vary the voltage of one of said pilot generators from its normal relation and vary the speed of its associated motor.

9. A control system for a motor having a field winding and an armature connected in driving relation with a roll stand comprising, a main generator having a field winding and an armature connected in circuit relation with the motor armature, a master generator operable to provide a variable reference voltage, circuit means including a buck and boost generator connected in circuit relation with the generator field winding and the master generator, a pilot generator normally operable to produce a voltage having a predetermined relation to the speed of the motor, a regulating generator responsive to a differential between the voltage of the pilot generator and a portion of the voltage of the master generator operable to control the output of the buck and boost generator, and control means operable to vary the relations between the voltage of the pilot generator and the voltage of the master generator to vary the differential.

10. In a control system for a plurality of electric motors, a separate main generator connected to supply electrical energy to each of the motors, a master generator operable to produce a common source of variable reference voltage, a control generator individual to each main generator connected in circuit relation with the source to vary the output of said control generator relative thereto, a pilot generator individual to each motor for producing a speed responsive voltage normally having a predetermined relation to the speed of its associated motor, a regulating generator individual to each control generator for regulating the output thereof, said regulating generator being responsive to a differential between predetermined portions of the speed responsive and common reference voltages, and circuit means responsive to the voltage of the master generator operable to vary the relationship of the voltage of the pilot generator of one of the motors relative to the speed of said one motor when the voltage of the master generator drops below a predetermined value.

11. In a control system for a plurality of motors connected in driving relation with the several elements of a work device having successive engagement with a strip of material, a main generator individual to each motor, a master generator providing a common variable reference voltage to collectively control the outputs of the main generators, a control generator individual to each main generator connected in circuit relation with the master generator for varying the output of its associated main generator relative to the reference voltage, a pilot generator individual to each motor operable to produce a voltage normally having a predetermined relation to the speed of said motor, a regulating generator individual to each control generator operable to regulate the output thereof in accordance with a differential between the voltages of the master generator and the associated pilot generator, circuit means responsive to the voltage of the master generator individual to each of said motors other than the leading one connected to increase the voltage of their respective pilot generators from the predetermined relation, and additional circuit means operable to vary the differential between the voltage of the master generator and the voltages of the pilot generators of each of the motors other than the leading one to take up a look in the strip between the devices.

12. A control system for a pair of motors driving work devices arranged to operate on a continuous length of strip material comprising, a main generator individual to each motor for supplying electrical energy thereto, a pilot generator individual to each motor operable to produce a voltage responsive to the speed of its associated motor, a master generator operable to produce a common variable reference voltage, a regulating generator individual to each main generator, each of said regulating generators being normally responsive to a differential between the voltage of its associated pilot generator and a predetermined portion of the voltage of the master generator operable to maintain a predetermined speed relation between the motors, and control means responsive to predetermined load conditions of one of the motors operable to vary the portion of the voltage of the master generator from said predetermined portion to change the speed relation of the motors from said predetermined relation.

13. In a control system for a pair of motors driving work devices arranged to operate successively on a continuous moving length of strip material, circuit means including control means for producing speed responsive control voltages operable to supply electrical energy to said motors for normally maintaining a predetermined speed relation therebetween, control means including a loop take-up relay operable to vary the effectiveness of one of said speed responsive control voltages to increase the no-load speed of the succeeding motor relative to the leading motor and increase the speed droop of said succeeding motor with increased load so as to retain substantially the same full load speed, and a load responsive relay connected to render the loop take-up relay inoperative.

14. In a control system for a pair of motors arranged in driving relation with successive work devices which operate on a continuous length of strip material, a pilot generator individual to each motor operable to produce a voltage proportional to the speed of the motor, a main generator individual to each motor for supplying electrical energy thereto, a master generator operable to produce a variable reference voltage for collectively controlling the outputs of the main generators, circuit means including a regulating generator individual to each main generator operable to control the output thereof, each of said regulating generators being differentially responsive to the armature current of its associated motor and to the voltage of its associated pilot generator, and control means operable to produce a voltage proportional to the rate of variation of the voltage of the master generator for modifying the control of the regulating generators.

15. In a control system for the driving motors of a roll stand and winding reel for winding a strip material delivered from the roll stand, a main generator individual to each of the motors for supplying electrical energy thereto, a master generator operable to produce a common reference voltage for controlling the output voltages of the main generators collectively, a regulating generator individual to each main generator for individually varying the output voltage thereof, a pilot generator individual to the roll motor operable to control the operation of the roll motor regulating generator in differential relation with the voltage of the master generator, and a pilot generator individual to each roll motor and the reel motor connected in circuit relation to control the output of the reel motor regulating generator.

16. A control system for a reel motor and the driving motor of an adjacent roll stand comprising, a master generator operable to provide a variable reference voltage, a pilot generator individual to each motor operable to provide a control voltage proportional to the speed of its motor, an additional pilot generator associated with the roll motor, a main generator individual to the roll motor having a field winding, an additional main generator individual to the reel motor having a pair of field windings, a control generator individual to the main generator for the roll motor connected in circuit relation with the field winding thereof and the master generator, a regulating generator connected to control the output voltage of the control generator and having a field winding connected for energization in accordance with a differential between the voltage of the pilot generator individual to the roll motor and the voltage of the master generator, circuit means including a field rheostat connecting one of the field windings of the main generator for the reel motor for energization in accordance with the voltage of the master generator, control means including a regulating generator connected to effect energization of the other field winding of the main generator for the reel motor, circuit means including a field rheostat operable in response to operation of the aforementioned field rheostat controlling the output of the reel motor regulating generator, and speed adjusting means including a field rheostat connected in circuit relation with the control generator and the field winding of the main generator for the roll motor operatively connected with both of the aforesaid field rheostats for operation in predetermined relation.

17. In a control system for a motor having a main generator connected in circuit relation therewith, a master generator operable to produce a reference voltage, control means for varying the field excitation of the master generator to vary the reference voltage, a pilot generator operable to produce a control voltage responsive to the speed of the motor, circuit means including a regulating generator having a field winding normally energized in accordance with a differential between the voltages of the master generator and the pilot generator, and switch means responsive to operation of the control means to reduce the reference voltage to a predetermined level, said switch means being operable to connect the field winding of the regulating generator for energization from the main generator in such a direction as to oppose any tendency of the residual voltage of the master generator to maintain the voltage of the main generator.

18. In a control system for a motor, a regulating generator connected to control the operation of the motor, excitation means for the regulating generator responsive to the load on the motor, opposing excitation means for the regulating generator responsive to a difference between the speed of the motor and a reference speed, and rectifier means so connected in circuit relation with the opposing excitation means as to render the opposing excitation means effective only when the speed of the motor exceeds the reference speed by a predetermined amount.

ERLING FRISCH.
CLINTON R. HANNA.
WILLIAM O. OSBON.

REFERENCES CITED

The following references are of record in the file of this patent:

UNITED STATES PATENTS

| Number | Name | Date |
| --- | --- | --- |
| 2,254,886 | Cook | Sept. 2, 1941 |
| 2,342,767 | Stoltz | Feb. 29, 1944 |